United States Patent [19]

Hoh et al.

[11] 3,723,397
[45] Mar. 27, 1973

[54] ETHYLENE/VINYL ESTER/CARBOXYLIC ACID COPOLYMERS

[75] Inventors: George L. K. Hoh; Donald E. Tuites, both of Wilmington, Del.

[73] Assignee: E. I. du Pont de Nemours and Company, Wilmington, Del.

[22] Filed: Feb. 2, 1971

[21] Appl. No.: 112,084

Related U.S. Application Data

[62] Division of Ser. No. 726,242, May 2, 1968, Pat. No. 3,594,338.

[52] U.S. Cl..............260/80.8, 117/132 B, 117/148, 260/17 R, 260/78.5 R
[51] Int. Cl...............................................C08f 15/40
[58] Field of Search.........................260/80.8, 78.5 R

[56] References Cited

UNITED STATES PATENTS

| | | | |
|---|---|---|---|
| 2,200,429 | 5/1940 | Perrin et al. | 260/80 |
| 2,703,794 | 3/1955 | Roedel | 260/87.3 |
| 3,215,678 | 11/1965 | Adelman | 260/80.5 |
| 3,321,420 | 5/1967 | Unger | 260/17 |

FOREIGN PATENTS OR APPLICATIONS

| | | | |
|---|---|---|---|
| 28,958 | 4/1968 | Japan | 260/80.8 |
| 680,105 | 2/1964 | Canada | 260/80.8 |

*Primary Examiner*—James A. Seidleck
*Assistant Examiner*—Stanford M. Levin
*Attorney*—Ivan G. Szanto

[57] ABSTRACT

Ethylene/vinyl ester/carboxylic acid copolymers containing at least 35 weight percent vinyl ester and at least 0.5 weight percent monocarboxylic or dicarboxylic acid or the half ester of the latter. The copolymers are particularly suitable in nitrocellulose lacquers for coating metal substrates where enhanced flexibility and adhesion are required.

2 Claims, No Drawings

ETHYLENE/VINYL ESTER/CARBOXYLIC ACID COPOLYMERS

This is a division of application Ser. No. 726,242, filed May 2, 1968 and now U.S. Pat. No. 3,594,338.

BACKGROUND OF THE INVENTION

Nitrocellulose has long been used as a principal film-forming ingredient of lacquers. More particularly, as illustrated in U.S. Pat. No. 3,321,420 issued to Unger on May 23, 1967, improved nitrocellulose lacquers are obtained by using, in addition to nitrocellulose, a copolymer of ethylene with an ethylenically unsaturated ester of a saturated fatty acid, e.g., vinyl acetate. As described in this patent, such lacquers are characterized by unusually good flexibility, scuff resistance, freedom from blocking, tensile strength, resistance to migration of ink colors through protective overcoats, and good adhesion. While such lacquers are indeed extremely useful for many applications, for certain uses adhesion and flexibility properties in excess of those obtained with the above-described lacquers containing the binary copolymers are desired. A particular application where such improved properties are desired is when the lacquers are used in combination with metal substrates, such as unprimed aluminum. For such applications, a nitrocellulose lacquer having very high flexibility and substrate adhesion would be very desirable.

SUMMARY OF THE INVENTION

According to the present invention there is provided an organic solvent-containing lacquer composition having a solids content essentially comprised of an ethylene/vinyl ester/carboxylic acid polymer and nitrocellulose. The copolymer is present in an amount of about 10–60 weight percent, based on the weight of total solids in the lacquer, and contains at least 35 weight percent copolymerized vinyl ester and at least 0.5 weight percent copolymerized carboxylic acid. The present lacquers can be used in all the known applications for nitrocellulose lacquers, e.g., wood scalers and other surface coatings, but show particular utility as coatings for metal substrates where enhanced flexibility and adhesion characteristics are required.

DESCRIPTION OF THE PREFERRED EMBODIMENT

As indicated above, the use of nitrocellulose in lacquer compositions is quite well known. With respect to the present invention, most of the knowledge regarding such lacquers is applicable. Attention is particularly directed to the Unger patent, U.S. Pat. No. 3,321,420, for a description of items such as the useful types of nitrocellulose, the useful solvent systems for the nitrocellulose and copolymer, the general methods of preparing the lacquer compositions, and a general description of the various additives which are conventionally added to nitrocellulose lacquer compositions. With particular respect to this latter point, attention is directed to U.S. Pat. Nos. 3,476,694 granted Nov. 4, 1969 and 3,503,909 issued Mar. 31, 1970 in the name of Bowman et al. on Nov. 1, 1966. As therein disclosed, it is frequently desirable to include as an additional solid ingredient in nitrocellulose-based lacquers, sucrose acetate isobutyrate. Similarly, the inclusion of sucrose acetate isobutyrate in the present lacquer compositions has also been found to be advantageous when cost reductions and/or lower lacquer viscosities are desired. In general, this ingredient is included in an amount of about 20–40 weight percent, based on the total weight of solids, though greater or smaller amounts can also be used.

As distinguished from the Unger patent and the known technology with respect to nitrocellulose lacquers, the present lacquers contain, in an amount of about 10–60 weight percent, based on weight of total solids in the lacquer, an ethylene/vinyl ester/carboxylic acid copolymer. For use herein, such copolymers contain at least about 35 weight percent copolymerized vinyl ester and at least about 0.5 weight percent copolymerized carboxylic acid; the balance of the copolymer usually being copolymerized ethylene though small quantities of other copolymerized monomers can also be present. Generally, ethylene is present in a copolymerized amount of at least 2 weight percent. In particular, copolymers containing about 0.7–15 weight percent copolymerized acid and about 35–75 weight percent copolymerized vinyl ester, the balance being ethylene, have been found to be quite suitable. Presently preferred copolymers contain 1–5 weight percent acid, 35–55 percent vinyl ester, and the balance being ethylene.

While the molecular weight of useful copolymers is not particularly limited, very high molecular weight copolymers, i.e., those having a melt index of less than about 20, are ordinarily avoided since the resulting lacquers tend to have undesirably high viscosities. While there is no apparent limit on the upper limit of copolymer melt index, considerable difficulty is encountered in handling copolymers with a melt index in excess of about 200. Melt index can be measured according to ASTM procedure D-1238-57T.

The vinyl ester component of the presently useful copolymers can be selected from a wide variety of ethylenically unsaturated esters of saturated fatty acids both linear and branched. A comprehensive description of such vinyl esters is given in the aforementioned Unger U.S. Pat. No. 3,321,420. While vinyl acetate is the preferred vinyl ester for use herein other vinyl esters such as vinyl formate, vinyl propionate, vinyl butyrate, and vinyl versatate are also quite useful. As with the vinyl ester component, the carboxylic acid component of the present copolymers can be selected from a variety of monoethylenically unsaturated carboxylic acids. However, due to their ready availability, acrylic, and particularly methacrylic, acids are preferred. However, other unsaturated acids such as maleic acid, crotonic acid and fumaric acid as well as their half esters are also useful.

The present copolymers can be prepared by the generally well-known techniques for making ethylene copolymers. Of course, in order to introduce the carboxylic acid moiety into the copolymer, the unsaturated carboxylic acid monomer must be added to the polymerization reactor during polymerization or subsequently incorporated into the polymer by grafting. General techniques for making ethylene copolymers are described in U.S. Pat. Nos. 2,200,429 to Perrin et al. and 2,703,794 to Roedel. Further, attention is directed to U.S. Pat. No. 3,215,678 issued on Nov. 2, 1965 to Adelman. While this patent concerns the preparation of ethylene/vinyl ester/carboxylic acid copolymers containing lesser amounts of copolymerized vinyl esters than the present copolymers, the techniques therein described for preparing carboxylic acid-containing copolymers are quite useful. The following example illustrates the preparation of an ethylene/vinyl acetate methacrylic acid copolymer useful in the present lacquer compositions.

EXAMPLE I

Ethylene, vinyl acetate, and methacrylic acid were fed continuously at rates, respectively, of 12, 6, and 0.2 lbs./hr. into and through a 0.03 cubic foot stirred autoclave maintained at a temperature of 165° C. and a pressure of 24,000 psi. Diisopropylperoxydicarbonate initiator (45 percent in benzene) was also fed continuously at a rate equivalent to about 0.004 lbs./hr. (actual initiator). The reaction mixture continuously removed from the autoclave was stripped of unpolymerized monomers and solvent under reduced pressure and at elevated temperature. After operations had reached a steady state, the conversion of monomers to copolymer was 10.8 percent. The copolymer had a melt index of 41 and contained 37 percent vinyl acetate and 1.3 percent methacrylic acid (the balance being ethylene).

Regarding the presently useful ethylene/vinyl ester/carboxylic acid copolymers, it is felt that those containing 35–55 weight percent vinyl ester and 1–5 weight percent carboxylic acid are novel. Such copolymers, particularly when the vinyl ester is vinyl acetate and the acid is acrylic or methacrylic, yield especially superior metal substrate nitrocellulose lacquer coatings with respect to flexibility and adhesion.

As noted previously, lacquers of the present invention can be prepared by known techniques with known solvent systems. Based on the total solids of the lacquer, the present lacquers contain the ethylene/vinyl ester/carboxylic acid copolymer in an amount of about 10–60 percent. The preferred amount of copolymer employed in a particular lacquer composition is generally influenced by the end use of the lacquer and/or the presence of solid ingredients other than the nitrocellulose and copolymer. For example, when coating metal substrates a preferred lacquer contains, based on solids, 10–30 weight percent copolymer, 40–60 weight percent nitrocellulose, and 20–40 weight percent of a customary modifying resin. For wood sealing applications, preferred lacquers contain 30–50 weight percent copolymer, 30–50 weight percent nitrocellulose, and 10–30 weight percent of a modifying resin.

The following examples illustrate lacquer formulations of the present invention. All parts and percentages are by weight unless otherwise indicated.

EXAMPLE II

A 15 percent solids lacquer for coating metal substrates was prepared by dissolving the following ingredients in a solvent system of 50 percent toluene, 15 percent isopropyl alcohol, and 35 percent n-butyl acetate:

| | Parts |
|---|---|
| Nitrocellulose[1] (dry basis) | 50 |
| (1) acetate/methacrylic acid copolymer[2] | 20 |
| Sucrose acetate isobutyrate | 30 |

(1) ½ sec., 11.8–12.2% nitrogen, isopropanol-wet.
(2) Copolymer prepared in Example I.

The resulting lacquer had a viscosity (number 4 Ford Cup) of 25.5 seconds and gave clear films with high gloss. Metal coating properties were evaluated by spray coating the lacquers, to a thickness of 1 ± 0.2 mil thickness, on the below designated substrates. Prior to coating, the substrates were cleaned by dipping in trichlorethylene and, after coating, the substrates were conditioned for 7 days at 50 percent RH and 73°F. Thereafter, the substrates were tested as follows:

Adhesion — Cross hatch scotch tape test.
Reverse Impact — Gardner Impact Tester with 4 lb. impact rod and five-eighths inch punch.
Flexibility — Conical Mandrel — one-eighths inch bend.

Table 1 presents the results of the above tests using the Example II lacquer.

TABLE 1

| | |
|---|---|
| Adhesion (% Removed): | |
| Unprimed aluminum | 0 |
| Primed aluminum | 0 |
| Steel | 0 |
| Reverse Impact (inch-lbs.): | |
| Unprimed aluminum | 24 |
| Primed aluminum | 4 |
| Steel | <4 |
| Flexibility: | |
| Unprimed aluminum | Pass |
| Primed aluminum | Pass |
| Steel | Pass |

Comparatively, two similar lacquers, which were prepared with ethylene/vinyl acetate copolymers containing 40 and 45 weight percent vinyl acetate and no acid, showed reverse impact strengths on unprimed aluminum of only 4 inch-lbs. and, with the exception of the 40 percent copolymer on primed aluminum, failed the flexibility tests.

EXAMPLE III

A 14 percent solids wood scaler lacquer was prepared by dissolving the following ingredients in a solvent system of 25 parts toluene, 20 parts xylene, 10 parts isopropyl alcohol, 5 parts methyl isobutyl carbinol, 30 parts methyl isobutyl ketone, and 10 parts ethyl amyl ketone:

| | Parts |
|---|---|
| Nitrocellulose[1] (dry) | 40 |
| Ethylene/vinyl acetate/carboxylic acid copolymer[2] | 40 |
| "Arochem" 520 (maleic resin) | 20 |

(1) ¼ sec., 11.8–12.2% nitrogen, isopropanol-wet.
(2) Copolymer prepared in Example I.

The resulting lacquer had a viscosity of 21 seconds and yielded clear films with high gloss. Subsequent tests using this lacquer showed that it performed as well as lacquers prepared with the no acid copolymers specified under Example II.

We claim:

1. An ethylene/vinyl ester/carboxylic acid copolymer consisting essentially of 37–55 weight percent copolymerized vinyl ester of a saturated acid and 1–5 weight percent copolymerized carboxylic acid selected from the group consisting of unsaturated monocarboxylic and dicarboxylic acids or the half esters of the dicarboxylic acids.

2. The copolymer of claim 1 wherein the acid is acrylic or methacrylic acid and the vinyl ester is vinyl acetate.

* * * * *